United States Patent [19]
Wohlfahrt

[11] Patent Number: 5,924,443
[45] Date of Patent: Jul. 20, 1999

[54] DEVICE FOR LIMITING THE PRESTRESS OF A CONTROL SPRING

[75] Inventor: Harald Wohlfahrt, Wiesmath, Austria

[73] Assignee: Hygrama AG, Rotkreuz, Switzerland

[21] Appl. No.: 08/883,169

[22] Filed: Jun. 26, 1997

[30] Foreign Application Priority Data

Jun. 26, 1996 [AT] Austria .................................. 1130/96

[51] Int. Cl.⁶ .................................................. G05D 16/06
[52] U.S. Cl. ........................ 137/505; 137/116.5; 251/337
[58] Field of Search ............... 137/505, 505.26, 137/505.36, 505.38, 505.41, 505.42, 116.5; 251/337

[56] References Cited

U.S. PATENT DOCUMENTS

| | | | |
|---|---|---|---|
| 3,068,883 | 12/1962 | Brumm | 137/116.5 |
| 4,696,320 | 9/1987 | Bull | 137/505 X |
| 4,741,359 | 5/1988 | Siebald | 137/505.42 |
| 5,452,741 | 9/1995 | Tomita et al. | 137/505 X |

Primary Examiner—Stephen M. Hepperle
Attorney, Agent, or Firm—Watson Cole Grindle Watson, P.L.L.C.

[57] ABSTRACT

A device for limiting the prestress of a control spring (17) which is particularly well-suited for pressure control valves and similar equipment, the control spring (17) being located in a spring housing (15) and supported on a spring plate (18) which can be adjusted by means of a rotating adjustable spindle (19) that is provided with a thread for prestressing the control spring (17), includes an end stop (22), which, by means of its own adjusting device which can be operated from outside the spring housing (15), can be adjusted and locked at any desired location between two end positions. When the spring plate (18) is moved in the direction which increases the prestress of the control spring (17), the spring plate (18) makes contact with the locking end stop (22), as a result of which the prestress of the control spring (17) is restricted to the preselected value.

3 Claims, 2 Drawing Sheets

DEVICE FOR LIMITING THE PRESTRESS OF A CONTROL SPRING

BACKGROUND OF THE INVENTION

1. Field of the Invention

The invention pertains to a device for limiting the prestress of a control spring, specifically a control spring of a pressure control valve, a pressure relief valve, a pressure scale, or similar devices, wherein the control spring is located in a spring housing and is supported on a spring plate which is screwed onto an adjustable spindle that is provided with an outer thread and can be turned by means of a handwheel and is secured in the spring housing against turning, but is held so it can be displaced axially, and wherein the control spring is combined with an end stop for the spring plate which limits its adjustment for the prestressing of the control spring.

2. The Prior Art

In control engineering it is well-known that the size of the controlled value, e.g., the pressure of a pressure control valve, is determined by the force exerted by the control spring. The desired value is set by changing the prestress of the control spring. In that regard, it is normally possible to prestress the spring to an extent such that the controlled value attains its maximum value, which in the case of a pressure regulator means that the controlled pressure matches the inlet pressure which is being supplied. In many cases, a limiting of the controlled value to a lower figure is necessary for safety reasons.

In order to make it possible to limit the controlled value, it is well-known in the case of devices as described above that a fixed limit stop which limits the adjustment area is provided on the adjustable spindle, by means of which the spring plate for the prestressing of the control spring can be adjusted, or else it is provided on another screw for adjusting the prestress. In series production, this limit stop is often mounted at a location at which it prevents the control spring being pressed to the blocking point. For applications in which a specific, lower value is desired, the limit stop must be placed at the appropriately matched location during production.

Two designs are known for pressure control valves. In one design the spindle length and the fixed limit stop are already configured or arranged in terms of their design in such a way that the control spring can be prestressed only to the predetermined extent. This design makes possible normal, series-production assembly. However, this results in a large tolerance in the limit value achieved by the adjustment, since length tolerances of the adjustable spindle, spring pressure tolerances, and tolerances in the effective membrane diameter add to one another and collectively have an effect on the limit value.

With the second design the limit stop is formed by means of a limit stop nut which, after the desired prestress has been adjusted, is screwed onto the adjustable spindle until it makes contact with the spring plate. Doing this makes it possible to more accurately limit the pressure. However, this limitation can also be carried out only at the factory, and cannot easily be changed afterwards. In addition, doing this also requires partial disassembly of the device after it has been adjusted in order to secure the limit stop nut. Subsequent to that, the pressure regulator must be checked once again, because it is possible that the desired prestress has been changed by the assembly work.

The invention performs the task of improving the previously known devices for limiting the prestress of a control spring in such a way that the limitation can also be simply and accurately adjusted to a desired value by the end user of the device in question without difficult assembly work.

SUMMARY OF THE INVENTION

The object of the invention is achieved by placing the end stop for the spring plate in the spring housing between two end positions in a manner such that it can be adjusted in the axial direction of the adjustable spindle for the spring plate by means of its own adjusting device, which is accessible for actuation from outside the spring housing, and can be locked in any desired location between the end positions. With this design it is possible, with the spring housing fully assembled, to adjust the prestress of the control spring by adjusting the spring plate to the desired or maximum permissible value by means of the adjustable spindle, and then to adjust the end stop by means of its own adjusting device until it lies against the spring plate, and to fix it in this position. The prestress of the control spring can then be decreased at any time by means of the adjustable spindle, but it can be increased only until the spring plate contacts the end stop. Since no assembly work of any kind is required on the device itself, the desired prestress of the control spring can be easily adjusted at any time, and even changed, in conjunction with which the adjustment is carried out while the device is in operation and can therefore be continuously checked so the exact value can always be set without harmful tolerances.

In a preferred embodiment of the invention the adjustable spindle of the spring plate is provided with a channel which passes through in the axial direction, and the adjusting device for the limit stop includes a rod which passes through the channel and which can be adjusted within it, and on which there is provided a limit stop which projects into the adjustment area of the spring plate. In conjunction with that the adjustment of the desired prestress of the control spring is carried out by adjusting the rod which passes through the channel, as a result of which the limit stop is brought into the desired position. Furthermore, this embodiment is characterized by the fact that it requires practically no additional space because the adjusting device for the end stop is housed in the interior of the adjustable spindle.

In conjunction with this, in a different configuration of the invention, the rod can be designed as a screw which is anchored within the channel of the adjustable spindle in a way such that it can be rotated, and which is screwed into one end of the sleeve which is guided within the channel and which has an inner thread at one end of the sleeve, at the other end of which is provided the limit stop for the spring plate. The moving of the limit stop for the spring plate, and thus the adjusting of the prestress of the control spring, is thereby carried out by simply turning the screw.

With this version of the invention, in order to securely hold the screw, the latter can be supported in a rotating fashion by a screw head against a projection of the adjustable spindle and secured within the channel of the adjustable spindle so it cannot fall out, for example, by means of a flanged border of the adjustable spindle.

In accordance with a further variant of the invention, the screw can be provided with a right-hand thread starting from one end and with a left-hand thread starting from the other, whereby one end is screwed into the channel, which is provided with an inner thread, and the other end is screwed into a sleeve which includes the limit stop for the spring plate. In this embodiment as well the adjusting of the limit stop for the spring plate is carried out by simply turning, from outside the spring housing, the screw which is provided in the channel of the adjustable spindle.

In accordance with the invention it is also possible to provide the rod which has been implemented as a screw provided with a thread at one end by means of which it is screwed in an adjustable manner into an inner thread in the channel of the adjustable spindle or into a nut which is supported on the adjustable spindle, in conjunction with which it includes at its other end the limit stop for the spring plate. To adjust the limit stop, either the rod is screwed more or less into the inner thread of the channel in the adjustable spindle, or the nut is simply moved, as a result of which the rod with the end stop for the spring plate is likewise adjusted.

With all of the embodiments of the invention, the limit stop for the spring plate can be formed of a pin which passes diametrically through the rod and which is guided at both ends in longitudinal slots in the adjustable spindle in such a way that it cannot rotate but can move axially, and projects over the outer jacket of the adjustable spindle into the adjustment area of the spring plate. This limit stop is simple and can be produced with little expense, and is also easy to install. At the same time, it accomplishes its task of limiting the adjustment of the spring plate for increasing the prestress of the control spring.

An additional embodiment is possible according to the invention in which the rod which includes the limit stop for the spring plate and which is configured with a semicircular cross section is guided in an axially displacable manner in a matching channel of the adjustable spindle, and can be locked at any desired location. The rod is thus secured against rotating within the channel of the adjustable spindle. In conjunction with this, the adjusting of the end stop is not carried out by turning the rod, but rather by displacing it in the axial direction within the channel in the adjustable spindle. This can be done in a variety of ways.

One possibility for displacing the rod within the channel of the adjustable spindle consists in the fact that for its adjustment and locking, the rod icludes on its outer jacket a screw thread which is comprised of a half-thread, the adjustable spindle is provided on its end with a mirror-image matching half-thread, and a common nut is screwed onto the two mutually complementary half-threads. The nut can be removed and the rod with the semicircular cross section shifted by one or more threads, whereupon the nut for locking the rod is again screwed on. As a result, it is possible to adjust the rod, and thus the end stop for the spring plate, in steps, one thread at a time, in both longitudinal directions.

In accordance with the invention, an alternative for mutual adjustment and locking involves providing each of the rod and the adjustable spindle with a semicircular groove and the two grooves are placed together to form a complete cylindrical bore, one half of which exhibits a thread into which a setscrew engages, and this setscrew is supported in the other half of the bore in such a way that it rotates, but can also move axially. In this embodiment, the displacement of the semicircular rod within the channel in the adjustable spindle is carried out by a simple turning of the setscrew, as a result of which the rod is displaced as well and the end stop for the spring plate can be brought into the desired position.

Finally, the invention provides for one additional improvement, according to which the location on the spring housing at which the adjusting device for the limit stop is accessible from the outside is covered by the handwheel which is placed on the adjustable spindle for actuating it. This is done as a safety precaution to ensure that the limit which has been set for the prestress force cannot be changed during later operation unintentionally and without an appropriate tool. Nevertheless, a change in the adjustment is still possible at any time. The handwheel simply has to be removed first, whereupon the adjusting device is accessible from outside and can be operated by means of an appropriate tool.

Additional details and advantages of the invention can be found in the following description of embodiments which are shown in the drawings.

DETAILED DESCRIPTION OF THE PREFERRED EMBODIMENTS

Figure 1:
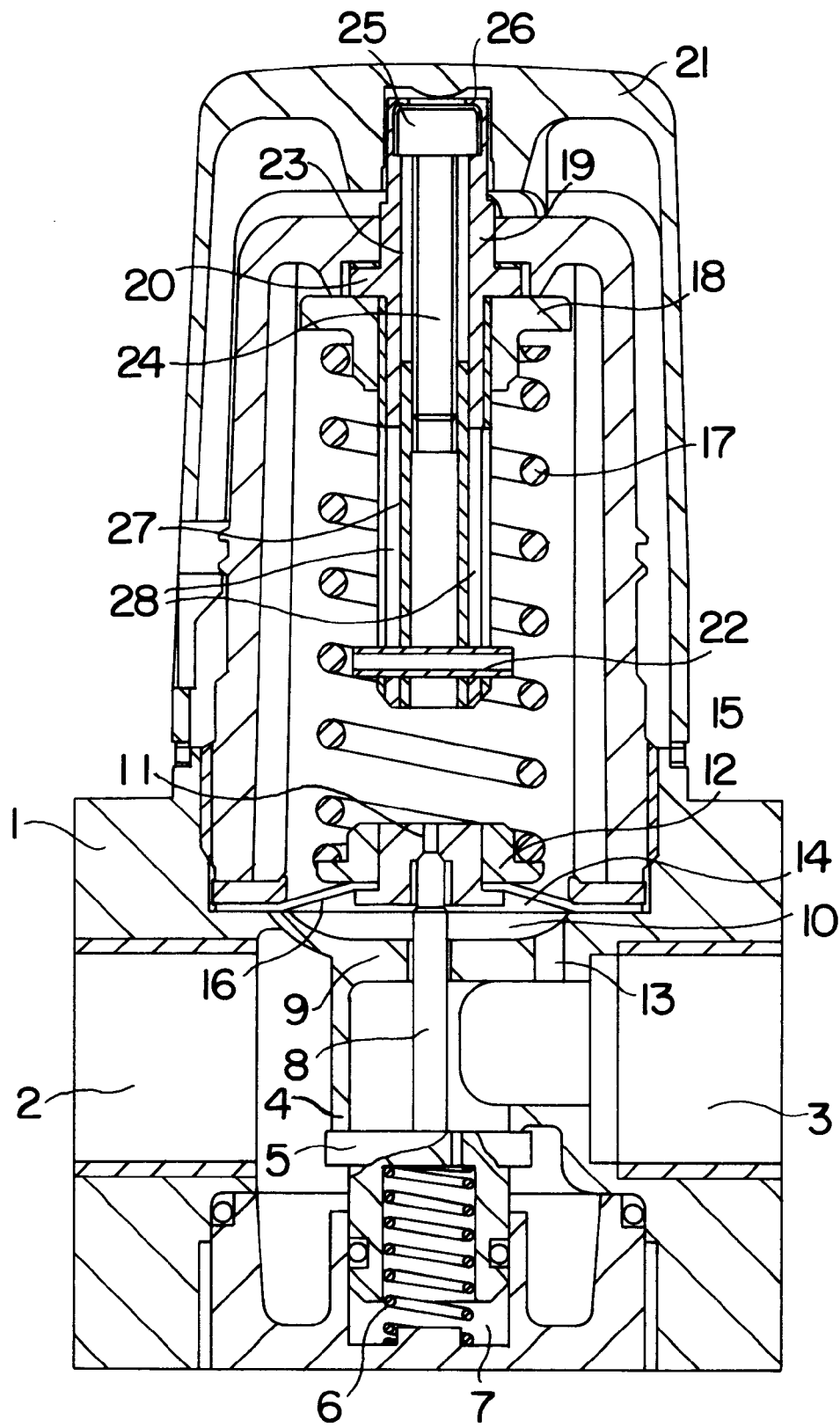
FIG. 1 shows an axial longitudinal section through a device in accordance with the invention, in the form of a pressure control valve.

The pressure control valve in accordance with FIG. 1 includes a valve housing 1 with an inlet 2 for the inlet pressure and an outlet 3 for the controlled secondary pressure. Between the inlet side and the outlet side there is provided a ring-shaped valve face 4 which is controlled by a valve gate 5. The latter is loaded in the direction of the valve face 4 by means of a closing spring 6, and is guided in a cylinder 7 in a sealed manner for pressure relief. On the side opposite the closing spring 6, the valve gate 5 is permanently fastened with a pin 8, which passes through a limiting wall 9 of the valve housing 1 and ends in a diaphragm area 10, in which it controls a valve opening 11 in a diaphragm disk 12. The diaphragm area 10 is connected with the outlet 3 by means of a channel 13.

On its top side, the valve housing 1 is provided with a cylindrical recess 14 which includes a thread into which a spring housing 15 is screwed. The spring housing 15 tightly clamps into place at its outer perimeter in the recess 14 a control diaphragm 16 which is loaded by a control spring 17, one end of which lies against the diaphragm disk 12. The other end of the control spring 17 is supported on a spring plate 18, which is screwed onto an adjustable spindle 19 that is provided with an outer thread. The adjustable spindle 19 passes through the spring housing 15 and is supported at the inside of the spring housing 15 with a collar 20. On the end of the adjustable spindle 19 which lies on the outside, there is placed, in such a way that it cannot rotate, a cap-like handwheel 21 which rotates with the adjustable spindle 19, and in this way the spring plate 18 can be adjusted in order to change the prestress of the control spring 17. The adjustability of the spring plate 18 along the adjustable spindle 19 is restricted by an end stop 22.

In order to limit the prestress of the control spring to a desired maximum value, the end stop 22 can in turn also be adjusted in the axial direction of the adjustable spindle 19. To do this, it is provided with its own adjusting device, which is accessible for operation from outside the spring housing 15, and which makes possible an adjustment of the end stop 22 between two end positions, as well as a locking of same at any desired location between the end positions. In FIG. 1, the end stop 22 is in the lowest end position where the maximum prestressing of the control spring 17 is possible.

As can be seen from FIG. 1, as well as from FIGS. 2 through 6, the adjustable spindle 19 of the spring plate 18 is provided with a channel 23 which extends through axially. The adjusting device for the end stop 22 includes a rod which passes through the channel 23 and can be adjusted within it, and on which the end stop 22 is provided, and which is configured in different ways in the individual embodiments.

Figure 2:
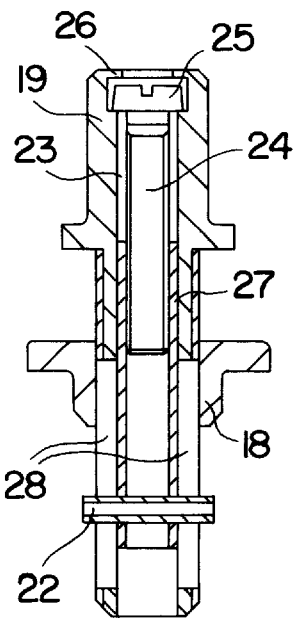
FIG. 2 shows the adjusting device of FIG. 1 in a different state.

In accordance with FIGS. 1 and 2, the rod is configured as a screw 24 which is supported on a screw head 25 in a rotatable fashion on a projection of the adjustable spindle 19. The screw 24, which is provided with threads, is screwed into a sleeve 27 which is also guided in the channel 23 of the adjustable spindle 19 and which has fastened on its lower end the limit stop 22. The adjustment of the end stop 22 is carried out by turning the screw 24 by means of the screw head 25, which is covered on the outside by the handwheel 21 that is placed on the upper end of the adjustable spindle 19. To carry out an adjustment, the handwheel 21 must therefore be removed first. As a result, any unintentional displacing of the adjustment of the pressure regulator, once it has been positioned, is prevented.

The limit stop 22 is implemented as a pin which is fastened in a transverse bore which passes through the sleeve 27, projecting beyond the sleeve to the sides, and is guided in diametrically opposed longitudinal slots 28 in the adjustable spindle 19, as a result of which the sleeve 27 is at the same time prevented from turning within the adjustable spindle 19. The ends of the pin which forms the limit stop 22 also project beyond the adjustable spindle 19, and thus lie in the adjustment area of the spring plate 18.

In FIG. 1 the spring plate 18 is in its topmost end position, whereby the control spring 17 exhibits the least prestress. In contrast, the end stop 22 is shown in the lowest end position. As a result, by turning the adjustable spindle 19, the spring plate 18 can be screwed downward until it lies against the limit stop 22, the position where the control spring 17 has the greatest prestress. To limit the prestress, the limit stop 22 is moved upward by screwing the screw 24 into the sleeve 27 in FIG. 1, as a result of which the ability of the spring plate 18 to be moved towards the bottom is restricted.

The adjusting of the pressure regulator shown in FIG. 1 by means of the adjustable spindle 19 and the screw 24 can be carried out advantageously during the operation of the controller, that is, while under full pressure by the medium. First, the secondary pressure at the outlet 3 is adjusted to the maximum permissible value by turning the adjustable spindle 19 by means of the handwheel 21, as a result of which the control spring 17 is prestressed by means of the spring plate 18. The handwheel 21 is then removed and the limit stop 22 can be moved upwards by means of the screw 24 until it makes contact with the spring plate 18. This completes the adjustment, and the handwheel 21 can be placed back on the adjustable spindle 19. It is then only possible to move the spring plate 18 between its topmost end position and the end stop 22 which has been fixed in an intermediate position, so that the preselected maximum prestress of the control spring 17, and thus the maximum secondary pressure, cannot be exceeded.

In the view shown in FIG. 2, in which the adjusting device in essence is the same as the adjusting device in accordance with FIG. 1, the spring plate 18 and the end stop 22 are in the described intermediate position corresponding to a preselected maximum pressure. It can be seen that, as a result of the moving of the end stop 22, the range of adjustment of the spring plate 18 is limited in comparison with the representation in FIG. 1. The pressure regulator can thus now be moved only within the permissible range.

The embodiments in accordance with FIGS. 3 through 6 are variants of the adjusting device, whereby only the adjusting device is shown in FIG. 2 and the remaining parts of the pressure regulator, including the control spring in particular, have been left out. In these embodiments, the spring plate 18 and the end stop 22 are also shown in intermediate positions, which can also be adjusted in accordance with requirements here as well.

Figure 3:
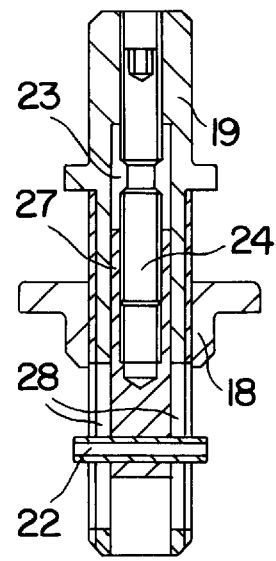
FIGS. 3 through 6 show several different embodiments of the adjusting device in accordance with the invention, also in center axial section.

In the embodiment according to FIG. 3, there is provided for the adjustment of the end stop 22 a screw 24, which is provided with a right-hand thread in one end section and with a left-hand thread in the other end section. The lower end is screwed into a sleeve 27, which is guided in a movable manner within the adjustable spindle 19, and the upper end into an inner thread provided in a channel 23 in the adjustable spindle 19. The limit stop 22, which is fastened to the sleeve 27, is—just like in FIGS. 2 and 4—guided in longitudinal slots 28 in the adjustable spindle 19, and can be brought, by turning the screw 24, into an intermediate position in which it limits the adjustment of the spring plate 18.

Figure 4:
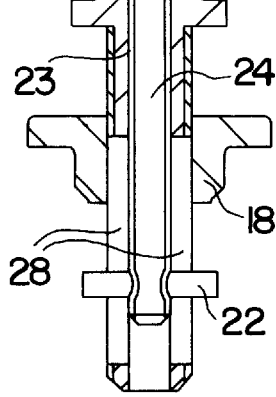

In FIG. 4, only a screw is provided for the adjustment of the limit stop 22, and fastened to its lower end is the end stop 22, which passes through the entire length of the adjustable spindle 19. Screwed onto the upper end of the screw 24 is a nut 29 which is supported on the adjustable spindle 19 and by means of which the screw 24 can be drawn upward, whereby the end stop 22 is brought along and thus slides in the longitudinal slots 28 of the adjustable spindle 19. In this way as well, the range of movement of the spring plate 18 is limited accordingly, as can be seen in FIG. 4.

Figure 5:
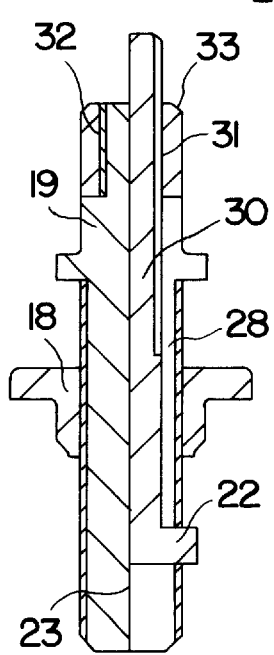
Figure 6:
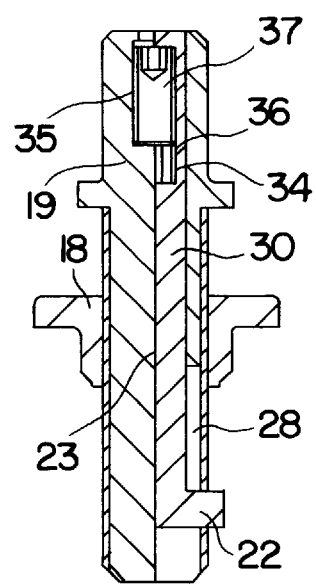

FIGS. 5 and 6 show embodiments in which, for the adjustment of the end stop 22, there is provided in each a rod 30 which has a semicircular cross section and which has joined on the lower end the limit stop 22. As can be seen from FIGS. 5 and 6, the limit stop 22 extends radially outward into the adjustment area of the spring plate 18 on only one side of the rod 33. Here as well, there is provided in the adjustable spindle 19 one longitudinal slot 28 each, in which the limit stop 22 is guided during its movement.

In the embodiment according to FIG. 5, the rod 30 includes a screw thread 31 that is comprised of half-threads. As a mirror image to that, the adjustable spindle 19 is also provided at its upper end with a screw thread 32 which is comprised of half-threads. Screwed onto the two half-threads is a common nut 33, which fixes the rod 30 in the particular position with the end stop 22. To adjust the rod 30, the nut 33 is first screwed off, whereupon the rod 30 can be shifted up or down by one step at a time, each of which corresponds to one screw thread. As a result, it is possible to bring the end stop 22 into the desired intermediate position and to limit the ability of the spring plate 18 to be moved. The nut 33 is then screwed back on, and the rod 30 is thus fixed in the new position with the end stop 22.

In the case of the embodiment according to FIG. 6, the adjusting of the rod 30 is somewhat simpler. There, the adjustable spindle 19 and the rod 30 are both provided with a semicircular groove 34,35, which face each other and together form a complete cylindrical bore. The semicircular groove 34 in the rod 30 is provided with an inner thread 36, into which a setscrew 37 engages which is supported in the semicircular groove 35 in the adjustable spindle 19 in such a way that it can turn freely. By turning the setscrew 37, the rod 30 with the end stop 22 can be adjusted in the axial direction of the adjustable spindle 19.

The adjusting device in accordance with the invention for the selectable adjusting of an end stop can be used not only for pressure control valves, but for other equipment and devices as well, practically anywhere where a control spring is prestressed. Deserving of particular mention are pressure relief valves, pressure scales, and similar equipment in which the pressure of a pneumatic or hydraulic medium is determined by the prestress of a control spring. In addition, an application is conceivable for safety valves which are adjusted to a specific pressure and open a relief path when this pressure is reached.

I claim:

1. A device for limiting prestress of a control spring of a pressure control valve, a pressure relief valve, a pressure scale, or the like, which is located in a spring housing and is supported on a spring plate which is screwed onto an adjustable spindle that is provided with an outer thread and which can be turned by means of a handwheel and is secured in the spring housing against turning, but is held so it can be displaced axially, and including an end stop for the spring plate which limits adjustment for the prestressing of the control spring, wherein the end stop for the spring plate in the spring housing is placed between two end positions in a manner such that adjustment is enabled in the axial direction of the adjustable spindle for the spring plate by means of its own adjusting device, which is accessible for actuation from outside the spring housing, and can be locked in any desired location between the end positions, wherein the adjustable spindle of the spring plate is provided with a channel which passes through in the axial direction, wherein the adjusting device for the end stop includes a rod which passes through the channel and which can be adjusted therewithin and on which there is provided the end stop which projects into the adjustment area of the spring plate, and wherein the rod is a screw which is anchored within the channel of the adjustable spindle in such a way that it can be rotated, and is screwed into one end of a sleeve which is guided within the channel and which has an inner thread at one end of the sleeve, and at the other end of which is provided the end stop for the spring plate.

2. A device in accordance with claim 1, wherein the screw is provided with right-hand thread starting from one end and with left-hand thread starting from the other, and that one end is screwed into the channel, which is provided with an inner thread, and the other end is screwed into said sleeve which includes the end stop for the spring plate.

3. A device in accordance with claim 1, wherein the location on the spring housing at which the adjusting device for the end stop is accessible from the outside is covered by the handwheel which is placed on the adjustable spindle for actuation.

* * * * *